US008341680B2

(12) United States Patent
Matsuda

(10) Patent No.: US 8,341,680 B2
(45) Date of Patent: Dec. 25, 2012

(54) VIDEO APPARATUS

(75) Inventor: Masahiro Matsuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1961 days.

(21) Appl. No.: 11/165,186

(22) Filed: Jun. 24, 2005

(65) Prior Publication Data

US 2005/0289465 A1    Dec. 29, 2005

(30) Foreign Application Priority Data

Jun. 25, 2004   (JP) ................................ P2004-188650

(51) Int. Cl.
    *H04N 7/173*    (2011.01)
(52) U.S. Cl. ............ 725/88; 725/59; 725/133; 386/263; 386/343
(58) Field of Classification Search .................... 725/38, 725/51, 87, 110, 112; 348/734, E5.002, E7.071, 348/E7.081, E5.097, E5.104, E5.105, 564
    See application file for complete search history.

(56) References Cited

U.S. PATENT DOCUMENTS

| | | | | | |
|---|---|---|---|---|---|
| 5,521,631 | A | * | 5/1996 | Budow et al. | 725/87 |
| 5,805,235 | A | * | 9/1998 | Bedard | 725/38 |
| 5,907,322 | A | * | 5/1999 | Kelly et al. | 725/110 |
| 6,064,380 | A | * | 5/2000 | Swenson et al. | 725/87 |
| 6,219,839 | B1 | * | 4/2001 | Sampsell | 725/40 |
| 6,631,496 | B1 | * | 10/2003 | Li et al. | 715/200 |
| 6,718,365 | B1 | * | 4/2004 | Dutta | 709/203 |
| 7,286,747 | B1 | * | 10/2007 | Lewis et al. | 386/52 |
| 7,320,137 | B1 | * | 1/2008 | Novak et al. | 715/723 |
| 2002/0087968 | A1 | * | 7/2002 | Krishnan et al. | 725/140 |
| 2002/0129164 | A1 | * | 9/2002 | Van Der Meulen et al. | 709/239 |
| 2003/0046699 | A1 | * | 3/2003 | Nonomura et al. | 725/58 |
| 2003/0097497 | A1 | * | 5/2003 | Esakov | 710/16 |
| 2004/0255336 | A1 | * | 12/2004 | Logan et al. | 725/136 |
| 2005/0091690 | A1 | * | 4/2005 | Delpuch et al. | 725/88 |
| 2011/0091182 | A1 | * | 4/2011 | Look et al. | 386/200 |

FOREIGN PATENT DOCUMENTS

| | | |
|---|---|---|
| JP | 9-120666 | 5/1997 |
| JP | 2001-251578 | 9/2001 |
| JP | 2002-44586 | 2/2002 |
| JP | 2003-132091 | 5/2003 |
| JP | 2003-208343 | 7/2003 |

* cited by examiner

*Primary Examiner* — Brian Pendleton
*Assistant Examiner* — Dika C. Okeke
(74) *Attorney, Agent, or Firm* — Morgan, Lewis & Bockius LLP

(57) ABSTRACT

When a user issues a bookmark setup instruction, bookmark information, which includes identification information for a reproduction point whereat video and audio data for currently reproduced content are recorded, identification information for the pertinent content and position information indicating the current reproduction point are generated and stored in a storage unit. And when a user issues a bookmark display instruction, the bookmark information is read from the storage unit and a list of bookmarks is displayed. When one of the bookmarks on the list is selected and its reproduction is instructed, a command is transmitted to a reproduction apparatus, indicated in bookmark information that corresponds to the selected bookmark, to reproduce content, indicated in the bookmark information, beginning at a reproduction point designated in the bookmark information.

5 Claims, 3 Drawing Sheets

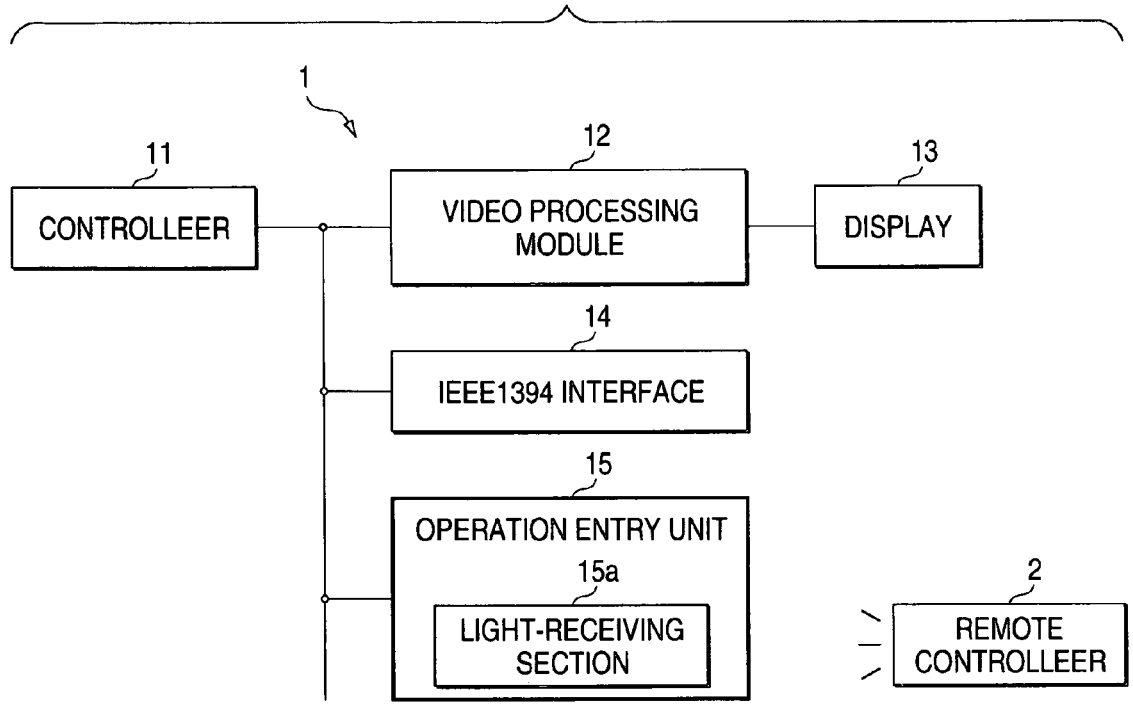
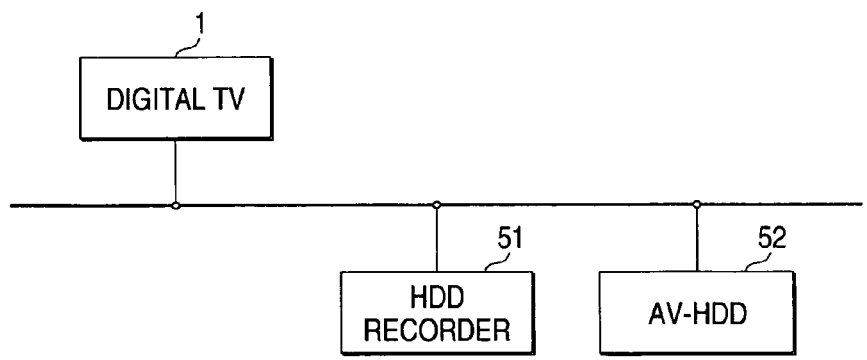

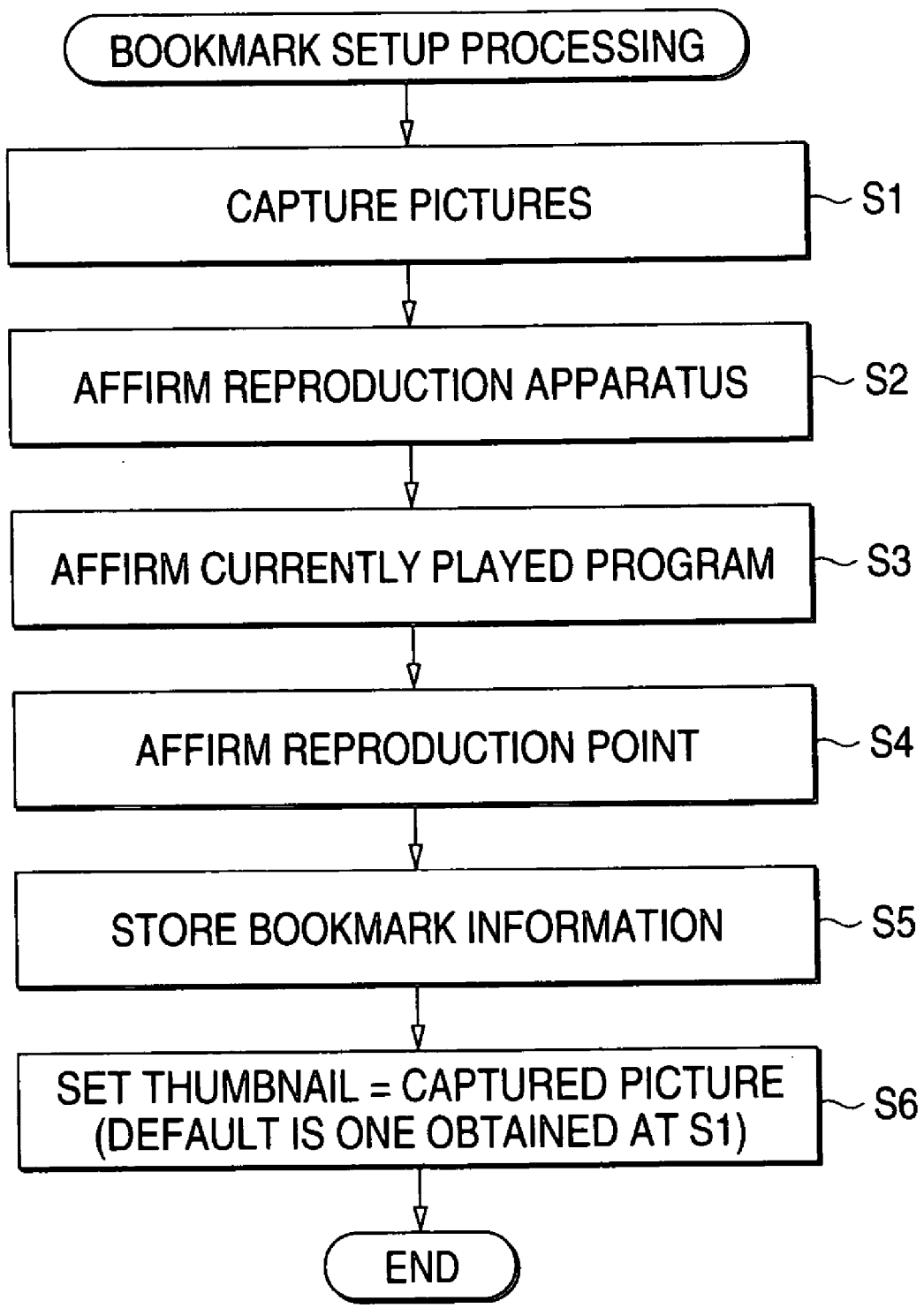

VIDEO APPARATUS

BACKGROUND OF THE INVENTION

1. Field of the Invention

The present invention relates to a video (audio and visual) apparatus that includes an interface such as the IEEE1394 interface, and plays stream data received via an interface from an externally connected reproduction apparatus.

2. Description of the Related Art

Some conventional recording/reproduction apparatuses for recording broadcast programs using digital data, such as HDDs (hard disk drives), have an included bookmark function for recording reproduction points for use as bookmarks during reproduction. By employing this bookmark function, a user can record a desired reproduction point on a hard disk, and can later search for and begin playing at that location.

According to another proposed application, the bookmark function would be extended so that bookmarks could be provided during the reproduction of content distributed across the Internet, or a list of bookmarks could be transferred to another reproduction apparatus (JP-A-2003-132091).

SUMMARY OF THE INVENTION

Recently, the aim has been the use of an AV system wherein a plurality of AV devices are connected via an IEEE1394 interface. In this AV system, for example, an HDD recorder that records and plays a received broadcast program, a dedicated recording and reproduction apparatus, called an AV-HDD, that records and plays broadcast programs received by another device, and a digital television that controls video output and an externally connected device are connected to a network, and based on a control signal transmitted by the digital television, stream data recorded by the HDD recorder and the AV-HDD are transferred to and played by the digital television.

It would also be very convenient for the bookmark function to be used by a system wherein, to view a program, stream data are transferred from an externally connected recording and reproduction apparatus.

However, for a conventional AV system, wherein an apparatus for recording and reproducing stream data and a video apparatus (may be either an apparatus that has a display device or an apparatus that outputs images to an external display device), which receives the stream data and controls the display output, are separately provided, the bookmark function is not provided for the apparatus that controls the display output.

Thus, were the bookmark function to be introduced into such an AV system without a special device being provided, the management of stream data by the recording and reproduction apparatus would interfere with the management of bookmark related stream data by the video apparatus that controls the display output, and the performance of these two processes would be thrown into disarray.

One of objects of the present invention is to provide a bookmark function for a video apparatus, one that can receive stream data, via an interface, from an externally connected recording and reproduction apparatus and can reproduce the stream data, without interfering with the management of stream data by the recording and reproduction apparatus.

According to a first aspect of the invention, there is provided a video apparatus including: an interface that receives stream data that includes video data and audio data from a reproduction apparatus connected thereto, and transmits the received stream data; an operation entry unit for accepting an input of an instruction; an information generation unit that generates, when a first instruction is entered via the operation entry unit, bookmark information that includes apparatus identification information that identifies the reproduction apparatus that stores the stream data for content currently being reproduced, content identification information that identifies the content currently being reproduced, position information that indicates a current reproduction point, and image data of a frame in the vicinity of the reproduction point indicated by the position information; a storage unit that stores the bookmark information generated by the information generation unit; a display unit that displays a list of the bookmark information stored in the storage unit and the image data correlated with the bookmark information when a second instruction is entered via the operation entry unit; and a controller that, when one of the bookmark information displayed is selected and a reproduction instruction is entered via the operation entry unit, outputs a command to a reproduction apparatus identified by the apparatus identification information related to the selected bookmark information to reproduce the stream data related to the content identified by the content identification information related to the selected bookmark information from a reproduction point indicated by the position information related to the selected bookmark information, wherein when displaying the list of the bookmark information, the controller issues an inquiry to the reproduction apparatus identified by the apparatus identification information included in the list to determine whether or not the reproduction apparatus is enabled, and to determine whether or not the content identified by the content identification information is stored in the reproduction apparatus, wherein the display unit displays an indication indicating that the bookmark information related to a disabled reproduction apparatus is non-reproduceable when displaying the list of the bookmark information, and wherein the display unit displays an indication indicating that the bookmark information related to the not-stored content is non-reproduceable when displaying the list of the bookmark information.

According to a second aspect of the invention, there is provided a video apparatus including: an interface that receives stream data that includes video data and audio data from a reproduction apparatus connected thereto, and transmits the received stream data; an operation entry unit for accepting an input of an instruction; an information generation unit that generates, when a first instruction is entered via the operation entry unit, bookmark information that includes apparatus identification information that identifies the reproduction apparatus that stores the stream data for content currently being reproduced, content identification information that identifies the content currently being reproduced, and position information that indicates a current reproduction point; a storage unit that stores the bookmark information generated by the information generation unit; a display unit that displays a list of the bookmark information stored in the storage unit when a second instruction is entered via the operation entry unit; and a controller that, when one of the bookmark information displayed is selected and a reproduction instruction is entered via the operation entry unit, outputs a command to a reproduction apparatus identified by the apparatus identification information related to the selected bookmark information to reproduce the stream data related to the content identified by the content identification information related to the selected bookmark information from a reproduction point indicated by the position information related to the selected bookmark information.

BRIEF DESCRIPTION OF THE DRAWINGS

The above objects and advantages of the present invention will become more apparent by describing preferred exemplary embodiments thereof in detail with reference to the accompanying drawings, wherein:

FIG. 1 is a block diagram showing the configuration of a digital television that is a video apparatus according to an embodiment of the present invention;

FIG. 2 is a diagram showing the configuration of an AV system wherein the digital television for the embodiment is connected;

FIG. 3 is a flowchart showing the bookmark setup processing performed by a controller in FIG. 1.

DETAILED DESCRIPTION OF THE PREFERRED EMBODIMENTS

Figure 4:
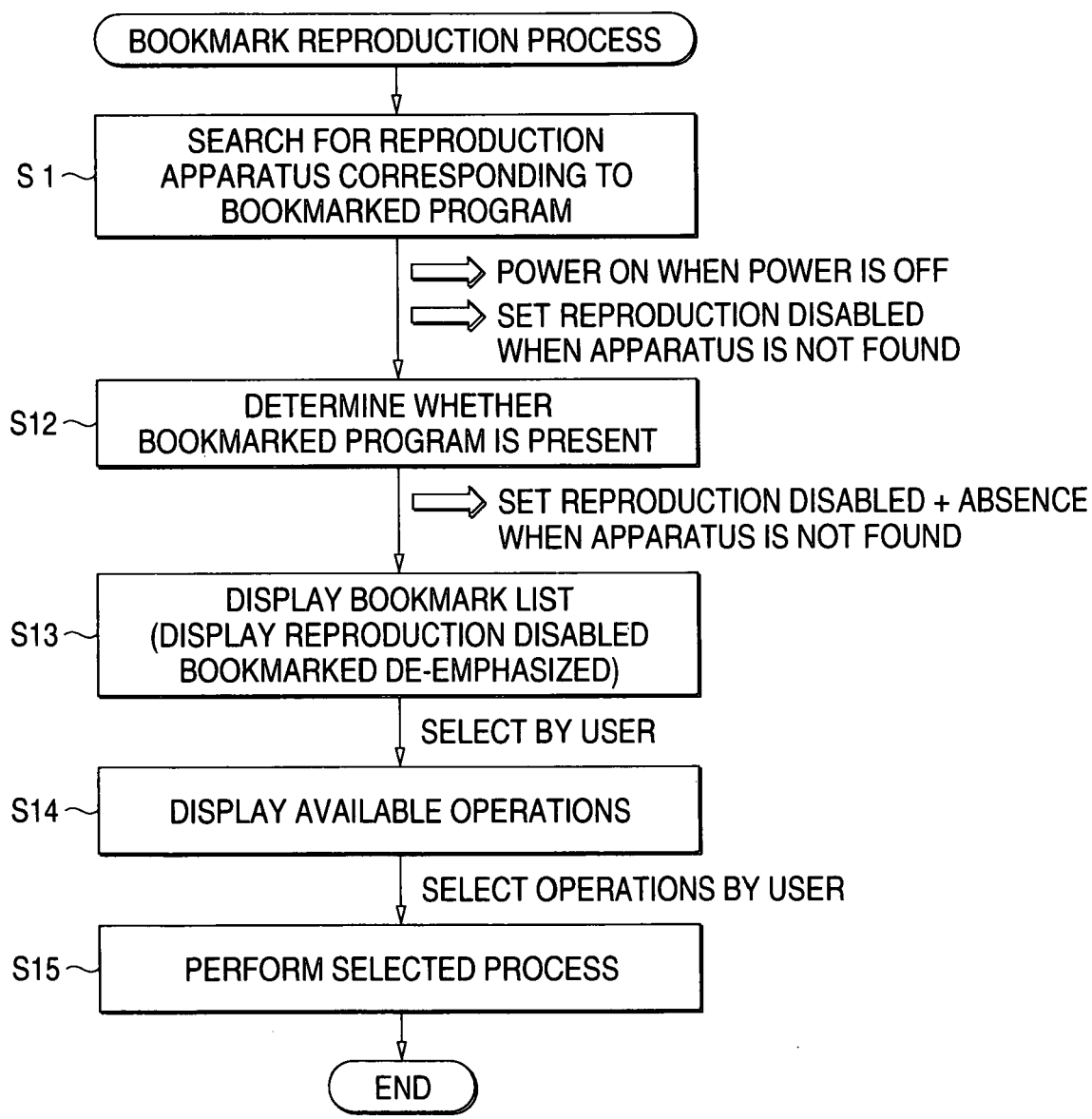
FIG. 4 is a flowchart showing the bookmark reproduction processing performed by the controller in FIG. 1.

The preferred embodiment of the present invention will now be described while referring to the accompanying drawings.

FIG. 1 is a diagram showing the configuration of a digital television that constitutes a video apparatus according to the embodiment of the invention. FIG. 2 is a diagram showing the configuration of an AV system wherein the digital television has been connected.

A digital television 1 in the embodiment includes an IEEE1394 interface that can be serially connected to a plurality of AV devices and that is connected to a reproduction apparatus, such as an HDD recorder 51, and a video apparatus, such as an AV-HDD 52, that digitally records and plays broadcast programs. The digital television 1 receives stream data, via the interface, and based on the received data, outputs video signals and audio signals.

A remote controller 2 is provided as an operation entry unit for the digital television 1, and when an instruction is entered, via the remote controller 2, control of the digital television 1, an operation related to a bookmark and operations performed by the external recording and reproduction devices 51 and 52 can be performed and controlled through the digital television 1.

As shown in FIG. 1, the digital television 1 includes: a controller 11, which controls the entire apparatus; a video processor 12, which processes video data and audio data and outputs a display signal to a display device 13; the display device 13, such as a plasma display device, which displays images; an interface 14, which performs signal processing and data processing conforming to the IEEE1394 standards; and an operation entry unit 15, which accepts an instruction from a user.

The controller 11 includes: a CPU, for executing programs; a nonvolatile storage device, in which control data and a control program are stored; a RAM, which provides a work memory space for the CPU; and a nonvolatile memory, which, as storage means, id used to store data that should be maintained when the power is off. The CPU and the control program stored in the nonvolatile storage device constitute an information generation function, a list display function, a first control function and a second control function. A light-receiving section 15a, for receiving a signal from the remote controller 2, is provided for the operation entry unit 15.

In the digital television 1, through the data processing performed between the interface 14 and the controller 11, for which the standards conform to those of the IEEE1394, communication according to the IEEE1394 standards or communication according to a higher protocol (AVC protocol or IEC61883) is enabled with the recording and reproduction devices 51 and 52, which are externally connected via the interface 14. Through this communication, the digital television 1 can transmit commands to the external recording and reproduction devices 51 and 52 to obtain from them various data or to receive from them designated stream data.

The processing related to bookmarks performed by the thus arranged digital television 1 will now be described while referring to FIGS. 3 and 4.

FIG. 3 is a flowchart showing the bookmark setup processing performed by the controller 11.

When a bookmark setup menu is selected by the remote controller 2 (first instruction) while a recorded program is being played in the digital television 1, the bookmark setup processing is started. A special button for a bookmark setup may be provided for the remote controller 2, and the bookmark setup processing may be started upon the pressing this button.

When the bookmark setup processing is begun, first, at step S1, the currently played picture is captured, and corresponding picture data are stored in the work area of the RAM. The picture data are used as thumbnails that represent a bookmark when a list of bookmarks is displayed, and are stored in an appropriately reduced size.

Then, at step S2, a recording and reproduction apparatus is identified from which the picture that is currently being played has been transferred, and the identification information for the pertinent apparatus, the maker name and the model name of the apparatus are read and stored in the work area of the RAM. Specifically, a GUID, uniquely provided for an individual apparatus before being shipped from the factory, is employed as the identification information for the apparatus. Further, when the individual apparatuses are connected to the system, the GUIDs, the maker names and the model names have previously been exchanged and stored in the individual apparatuses. Therefore, at step S2, of the individual information for the apparatuses stored in the controller 11, data for the apparatus that is currently connected as a stream data transmission source are extracted and are stored in the RAM.

At step S3, identification information for a program (content) currently being played is obtained and stored in the work area of the RAM. Specifically, the identification information for the program is the ID of an object that is allocated to a virtual source plug at a point-point connection performed by using a higher IEEE1394 protocol. In addition to the identification information for the program, the information for a recording date and a recording period for the program are also obtained and are stored in the RAM.

At step S4, the current picture reproduction point (hour, minute and second) is identified, and is stored in the RAM. The information concerning the reproduction point can be obtained, based, for example, on the time stamp information accompanied with the stream data or the data for a reproduction period of time held in the digital television 1.

When these four sets of information are obtained, at step S5, the picture data obtained at step S1, the identification information for the recording and reproduction apparatus obtained at step S2, the identification information for the picture program obtained at step S3 and the information for the reproduction point obtained at step S4 are collectively generated as a single set of bookmark information, and this bookmark information is stored in the nonvolatile memory.

After the bookmark information has been stored, at step S6, the thumbnail setup change process is performed. Normally, the picture data obtained at step S1 are stored as a thumbnail picture included in the bookmark information stored at step S5. However, at step S6, a change in the thumbnail is accepted during a predetermined period of time. When the instruction for the setup of the thumbnail is entered at this time, the picture data included in the bookmark information are replaced with the captured picture data. The bookmark setup processing is thereafter terminated.

FIG. 4 is a flowchart showing the bookmark reproduction processing performed by the controller 11.

When the user manipulates the remote controller 2 and selects a bookmark display menu (second instruction), the bookmark reproduction processing is started. When the bookmark reproduction processing is started, first, at step S11, all the bookmark information is read from the nonvolatile memory, and recording and reproduction apparatuses, wherein programs with bookmarks are provided and recorded, are searched for. During this search process, first, the information concerning connected apparatuses stored in the controller 11 is examined to find a target recording and reproduction apparatus. When the target recording and reproduction apparatus is not found, a first flag that represents reproduction is disabled is set effective for the bookmark information corresponding to the target recording and reproduction apparatus. Then, an IEEE1394 command is employed to issue a power state inquiry to the individual recording and reproduction apparatuses indicated in the bookmark information. When a target recording and reproduction apparatus is powered off, the IEEE1394 command for powering on is issued to power on the pertinent recording and reproduction apparatus.

When the process for searching for the recording and reproduction apparatus has been completed, at step S12, a check is performed to determine whether there are stream data for a program to which a bookmark has been added. During this process, information for recorded programs is read from a target recording and reproduction apparatus by using a higher IEEE1394 protocol, and whether the ID of a picture program included in the bookmark information is present is examined. When stream data for the picture program are not present, the first flag, which represents reproduction is disabled, and a second flag, which represents absence, are set both effective for the bookmark information for the picture program.

In accordance with the results at steps S11 and S12, the flag representing reproduction is disabled is set effective for the bookmark information, for which the corresponding recording and reproduction apparatus has not been found, and the reproduction disabling flag and the absence flag are set effective for the bookmark information, for which the corresponding recording and reproduction apparatus is present but for which a target program has not been saved.

After the processes at steps 11 and S12 have been performed, at step S13, all the recorded bookmark information is displayed on a bookmark list. In the bookmark columns on the list, thumbnails are displayed based on picture data obtained when the bookmarks were designated. Information for the recording dates and the reproduction points may additionally be displayed, and when information for program titles can be obtained, this information may also be added to the list.

On the list, when the thumbnails, the characters or the symbols are displayed de-emphasized for the bookmarks for which the reproduction disabled flag is set are effective, the user can ascertain that the identify reproduction for those has been disabled.

After the process at step S13, program control is shifted to the event driven processing wherein a predetermined process is to be preformed in accordance with an instruction input by the user. When the user selects one of the bookmarks on the list by manipulating the cursor button or the enter button of the remote controller 2, the process at step S14 is performed.

At step S14, operations available for the selected bookmark are displayed by using symbols, for example. And when a reproduction enabled bookmark is selected, buttons, such as "play, delete a bookmark and cancel", are displayed in the display column of this bookmark, or in a part of the screen. When the selected bookmark is one such that the absence flag has been effective for the bookmark information, the "delete" button and a indication requesting deletion of the bookmark are displayed.

The indication for the deletion of the bookmark may be output when the bookmark is to be selected from the list. Specifically, when an arbitrary bookmark in the list is focused on by moving a cursor button, and when the flag for this bookmark represents an absence, the indication requesting the deletion of the bookmark may be output before the user presses the enter button to select it.

After the available operations have been displayed at step S14, and when the user manipulates the remote controller 2 to select one of the operations displayed, program control advances to step S15, and the controller transmits a command corresponding to this operation via the interface 14 to a target recording and reproduction apparatus, which then starts the operation. For example, when a reproduction instruction is entered, the controller 11 issues a command for the playing of a picture program, indicated in the bookmark information, beginning at a reproduction point indicated in the bookmark information. Also, the controller 11 permits the recording and reproduction devices 51 and 52 to transmit stream data, beginning at the reproduction point, to the digital television 1, so that the stream data are displayed. Or, when a delete instruction is entered by the user, corresponding bookmark information is deleted from the nonvolatile memory and also from the list for the bookmark information. When a cancellation instruction is entered, the controller 11 again returns to the selection process at step S13 and repeats the selection process.

As is described above, according to the embodiment, while a user is viewing a picture program based on stream data that are transmitted, via the interface, from the externally connected recording and reproduction devices 51 and 52 to the digital television 1, the user can manipulate a remote controller to designate a bookmark at a desired reproduction point and record it. Furthermore, the user can display a list of recorded bookmarks, and can select a desired bookmark and play pictures beginning at the location of the selected bookmark.

Since the management of bookmarks, such as the recording of bookmark information, is independently performed inside the digital television 1, the bookmark management does not interfere with the stream data management performed by the recording apparatus, and an occurrence wherein the two processes fall into disarray can be avoided. Furthermore, when the recording and reproduction apparatus is disconnected from the bookmark, or when the stream data have been deleted by the reproduction apparatus, a indication to that effect is displayed with the list of bookmarks, which is very useful for a user.

The present invention is not limited to the embodiment, and can be variously modified. For example, in the embodiment, the invention is applied for a digital television; however, it can be applied for a set-top box wherein a video apparatus is intensively controlled to permit an externally connected display device to output pictures, or for various other video apparatuses that play pictures.

In addition, in the embodiment, a recording and reproduction apparatus has been employed to transmit stream data;

however, an apparatus that reproduces only data, such as a DVD player, can also be employed.

The detailed arrangements for the embodiment, such as the internal configuration of the digital television and the processing related to a bookmark, can be appropriately changed without departing from the subject of the invention.

As described with reference to the embodiment, there is provided a video apparatus including an interface, for enabling the transmission and reception of stream data that includes video and audio data, so that stream data from an externally connected reproduction apparatus can be received, via the interface, and reproduced by the video apparatus. The video apparatus includes: an operation entry unit, for accepting an instruction relative to the video apparatus; an information generation function, for, when a first instruction is entered via the operation entry unit, generating bookmark information, including identification information for the reproduction apparatus wherein stream data for content currently being reproduced are recorded, identification information for the content currently being reproduced, and position information for a current reproduction point; a storage unit, for storing the bookmark information generated by the information generation function; a list display function, for, when a second instruction is entered via the operation entry unit, reading the bookmark information from the storage unit and displaying a list of bookmarks; and a control function, for, when one of the bookmarks on the list is selected and a reproduction instruction is entered via the operation entry unit, issuing a command to a reproduction apparatus, indicated by the bookmark information related to the selected bookmark, to reproduce, beginning at a reproduction point designated in the bookmark information, content indicated in the bookmark information.

With this arrangement, a bookmark can also be designated for stream data stored by an externally connected reproduction apparatus, such as an HDD recorder or an AV-HDD, while the data are being reproduced, and since the bookmark can be easily found later, the reproduction of the stream data can be immediately restarted at the designated position.

Data required for managing bookmarks are not recorded on the reproduction apparatus but on the video apparatus that controls the reproduction output, and the setting up of bookmarks will not at all interfere with the management of stream data by the reproduction apparatus. Therefore, the management of stream data by the reproduction apparatus and the management of bookmarks by the video apparatus will be performed independently, and the performance of the two processes will not be thrown into disarray.

It is preferable that the bookmark information include image data for a frame in the vicinity of a bookmark position, and that, in the list of bookmarks, images based on the image data be displayed in correlation with the bookmarks.

With this arrangement, a user can visually identify the programs for which bookmarks are designated, and the reproduction points of the programs.

It is preferable that the video apparatus includes: a control function, for, when the list of bookmarks is displayed, externally issuing an inquiry to determine whether the operation of reproduction apparatuses, indicated in one or a plurality of sets of bookmark information stored in the storage unit, has been enabled. When the operation of a reproduction apparatus corresponding to a bookmark has not been enabled, the list display function displays, with the list, a indication indicating that reproduction of the bookmark has been disabled.

Accordingly, this arrangement is more convenient for a user. When, for example, a reproduction apparatus wherein content for which a bookmark has been designated are recorded is currently disconnected from the network, and at this time, the pertinent content can not be reproduced, the user need simply glance at the list to understand the situation.

It is preferable that the video apparatus includes: a control function, for, when the list of bookmarks is displayed, externally issuing an inquiry to determine whether content indicated in one or a plurality of sets of bookmarks stored in the storage unit have been saved. When content corresponding to a bookmark have not been saved, the list display function displays, with the list, a indication indicating that reproduction of the bookmark has been disabled.

Accordingly, this arrangement is more convenient for a user. When, for example, content for which a bookmark has been designated have been deleted by a reproduction apparatus, the user can ascertain this simply by glancing at the list. Further, different forms may be employed with the list of bookmarks to display cases wherein reproduction is disabled because the reproduction apparatus has been disconnected from the network and cases wherein reproduction is disabled because data have been deleted, so that identifying the two cases can be readily performed.

As is described above, according to the embodiment, stream data can also be handled for content stored in an external reproduction apparatus, and bookmarks can be designated during the reproduction of the stream data. Further, reproduction can be easily started at a location provided for a bookmark.

In addition, since the reproduction apparatus stream data management process and the video apparatus bookmark management process are performed independently, a situation can be avoided in which these two processes interfere with each other and are thrown into disarray. Furthermore, when the reproduction apparatus is disconnected from the network, or when stream data have been deleted by the reproduction apparatus, this situation can be appropriately reflected in the bookmark processing provided to notify the user.

What is claimed is:
1. A video apparatus comprising:
an interface that is configured to be connected to a plurality of reproduction apparatuses each of which stores stream data including video data and audio data to receive the stream data from the reproduction apparatuses, the interface conforming to IEEE 1394 standards;
a processing unit that is configured to process the stream data received via the interface and transmits the stream data to a display apparatus to reproduce contents of the stream data on the display apparatus;
an operation entry unit that is configured to accept an input of an instruction;
an information generation unit that is configured to generate bookmark information when a first instruction is entered via the operation entry unit while one of the contents of the stream data stored in one of the reproduction apparatuses is reproduced, the bookmark information including apparatus identification information that identifies one of the reproduction apparatuses that stores the stream data currently being reproduced, content identification information that identifies one of the contents currently being reproduced, position information that indicates a reproduction point in one of the contents currently being reproduced, and image data of a frame corresponding to the reproduction point indicated by the position information;
a storage unit that is configured to store the bookmark information generated by the information generation unit;

a listing unit that is configured to generate a list of the bookmark information stored in the storage unit, the list including the image data correlated with the bookmark information to display the list on the display apparatus when a second instruction is entered via the operation entry unit; and a controller that, when one of the bookmark information displayed is selected and a reproduction instruction is entered via the operation entry unit, is configured to output a command to one of the reproduction apparatuses identified by the apparatus identification information related to the selected bookmark information to transmit the stream data related to one of the contents identified by the content identification information related to the selected bookmark information and a command to the display apparatus to reproduce one of the contents from the reproduction point indicated by the position information related to the selected bookmark information, wherein when displaying the list of the bookmark information on the display apparatus, the controller issues an inquiry to the reproduction apparatuses related to the bookmark information in the list to determine whether or not each of the reproduction apparatuses is enabled, and to determine whether or not each of the reproduction apparatuses stores the content related to the bookmark information in the list, the listing unit generates the list with an indication indicating that the bookmark information related to a disabled one of the reproduction apparatuses is non-reproduceable when displaying the list of the bookmark information on the display apparatus, the listing unit generates the list with an indication indicating that the bookmark information related to one of the contents not-stored is non-reproduceable when displaying the list of the bookmark information on the display apparatus, when one of the bookmark information displayed on the display apparatus is selected from the list, a button indicating operations available for the selected one of the bookmark information is displayed, if the selected one of the bookmark information is reproduceable, the button including a play button for reproducing the selected one of the bookmark information, a delete button for deleting the selected one of the bookmark information from the list and a cancel button for canceling selection of the selected one of the bookmark information, and if the selected one of the bookmark information is non-reproduceable, the button including only the delete button and a indication requesting deletion of the selected one of the bookmark information is displayed.

2. A video apparatus comprising:

an interface that is configured to be connected to a plurality of reproduction apparatuses each of which stores stream data including video data and audio data to receive the stream data from the reproduction apparatuses;

a processing unit that is configured to process the stream data received via the interface and transmits the stream data to a display apparatus to reproduce contents of the stream data on the display apparatus;

an operation entry unit that is configured to accept an input of an instruction;

an information generation unit that is configured to generate bookmark information when a first instruction is entered via the operation entry unit while one of the contents of the stream data stored in one of the reproduction apparatuses is reproduced, the bookmark information including apparatus identification information that identifies one of the reproduction apparatuses that stores the stream data currently being reproduced, content identification information that identifies one of the contents currently being reproduced, and position information that indicates a reproduction point in one of the contents currently being reproduced;

a storage unit that is configured to store the bookmark information generated by the information generation unit;

a listing unit that is configured to generate a list of the bookmark information stored in the storage unit to display the list on the display apparatus when a second instruction is entered via the operation entry unit; and a controller that, when one of the bookmark information displayed is selected and a reproduction instruction is entered via the operation entry unit, is configured to output a command to one of the reproduction apparatuses identified by the apparatus identification information related to the selected bookmark information to transmit the stream data related to one of the contents identified by the content identification information related to the selected bookmark information and a command to the display apparatus to reproduce one of the contents from the reproduction point indicated by the position information related to the selected bookmark information, wherein when displaying the list of the bookmark information on the display apparatus, the controller issues an inquiry to the reproduction apparatuses related to the bookmark information in the list to determine whether or not each of the reproduction apparatuses is enabled, the listing unit generates the list with an indication indicating that the bookmark information related to a disabled one of the reproduction apparatuses is non-reproduceable when displaying the list of the bookmark information on the display apparatus, when one of the bookmark information displayed on the display apparatus is selected from the list, a button indicating operations available for the selected one of the bookmark information is displayed, if the selected one of the bookmark information is reproduceable, the button including a play button for reproducing the selected one of the bookmark information, a delete button for deleting the selected one of the bookmark information from the list and a cancel button for canceling selection of the selected one of the bookmark information, and if the selected one of the bookmark information is non-reproduceable, the button including only the delete button and a indication requesting deletion of the selected one of the bookmark information is displayed.

3. The video apparatus according to claim 2, wherein the bookmark information further includes image data of a frame corresponding to the reproduction point indicated by the position information, and wherein the listing unit generates the list including the image data in correlation with the bookmark information to display the list of the bookmark information on the display apparatus.

4. A video apparatus comprising:

an interface that is configured to be connected to a plurality of reproduction apparatuses each of which stores stream data including video data and audio data to receive the steam data from the reproduction apparatuses;

a processing unit that is configured to process the stream data received via the interface and transmits the stream data to a display apparatus to reproduce contents of the stream data on the display apparatus;

an operation entry unit that is configured to accept an input of an instruction;

an information generation unit that is configured to generate bookmark information when a first instruction is entered via the operation entry unit while one of the contents of the stream data stored in one of the reproduction apparatuses is reproduced, the bookmark information including apparatus identification information that identifies one of the reproduction apparatuses that stores the stream data currently being reproduced, content identification information identifies one of the contents currently being reproduced, and position information that indicates a reproduction point in one of the contents currently being reproduced;

a storage unit that is configured to store the bookmark information generated by the information generation unit;

a listing unit that is configured to generate a list of the bookmark information stored in the storage unit to display the list on the display apparatus when a second instruction is entered via the operation entry unit; and a controller that, when one of the bookmark information displayed is selected and a reproduction instruction is entered via the operation entry unit, is configured to output a command to one of the reproduction apparatuses identified by the apparatus identification information related to the selected bookmark information to transmit the stream data related to one of the contents identified by the content identification information related to the selected bookmark information and a command to the display apparatus to reproduce one of the contents from the reproduction point indicated by the position information related to the selected bookmark information, wherein when displaying the list of the bookmark information on the display apparatus, the controller issues an inquiry to the reproduction apparatuses related to the bookmark information in the list to determine whether or not each of the reproduction apparatuses stores the contents related to the bookmark information in the list, the listing unit generates the list with an indication indicating that the bookmark information related to one of the contents not-stored is non-reproduceable when displaying the list of the bookmark information on the display apparatus, when one of the bookmark information displayed on the display apparatus is selected from the list, a button indicating operations available for the selected one of the bookmark information is displayed, if the selected one of the bookmark information is reproduceable, the button including a play button for reproducing the selected one of the bookmark information, a delete button for deleting the selected one of the bookmark information from the list and a cancel button for canceling selection of the selected one of the bookmark information, and if the selected one of the bookmark information is non-reproduceable, the button including only the delete button and a indication requesting deletion of the selected one of the bookmark information is displayed.

5. The video apparatus according to claim 2, wherein the interface conforms to IEEE 1394 standards.

* * * * *